United States Patent Office 3,799,855
Patented Mar. 26, 1974

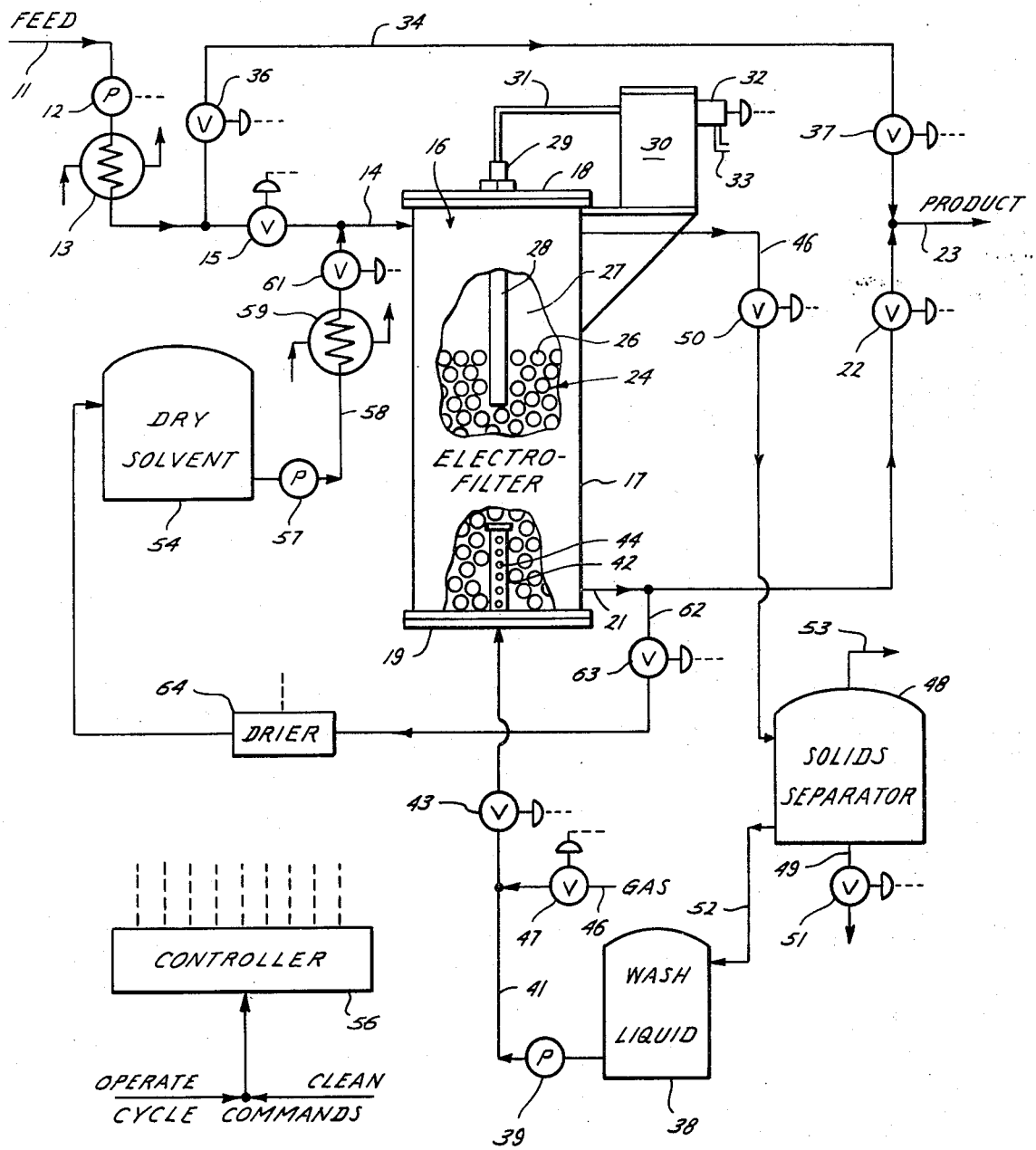

3,799,855
SOLIDS REMOVAL PROCESS
Albert D. Franse, Houston, Tex., assignor to Petrolite Corporation, St. Louis, Mo.
Filed June 15, 1972, Ser. No. 263,072
Int. Cl. B03c 5/02, 5/00
U.S. Cl. 204—188          17 Claims

ABSTRACT OF THE DISCLOSURE

A process for the removal of solids from a viscous heavy hydrocarbon stream such as petroleum residuum. The process includes the step of adjusting the temperature of a porous bed until the stream can flow therethrough without any significant condensation of dissolved or entrained water. The solids containing stream is passed through the porous bed which bed is formed of hard granular spheroidal particles. These particles are substantially uniform in size and of a rigid and substantially incompressible dielectric material. An electric field is established within the porous bed having an intensity of at least 5 kilovolts per inch of DC potential. The electric field causes the removal of solids from the stream and their tenacious adhesion to the particles. The stream with reduced solids contents is removed from the porous bed to a subsequent utilization. The particles are periodically cleaned of the accumulated solids to restore the solids-removal efficiency of the porous bed.

BACKGROUND OF THE INVENTION

(1) Field of the invention

This invention relates to the removal of solids from hydrocarbon streams by using electric fields. More particularly, these solids are removed by their deposition upon a particulate bed under the action of a high-voltage electric field.

(2) Description of the prior art

In highly industrial countries, the use of hydrocarbon fuels containing high sulphur contents has become highly restricted. The principal reason is founded with the generation of the various sulphur oxides produced by the combustion of these hydrocarbons. Most importantly, the fuels employed in the generation of electrical power have been substantially limited in their sulphur contents. For example, the Eastern seaboard of the United States has limited the sulphur content of residual fuels to less than 1% by weight. No fuel which has a higher sulphur content can be consumed for steam generation or in gas turbines. Unfortunately, most fuels derived from conventional refining techniques have sulphur contents above 1% by weight. A number of hydrodesulfurization processes have been originated for reducing the sulphur content of these fuels. In hydrodesulfurization, the hydrocarbon is heated to elevated temperatures above 600° F. Then, the hydrocarbon is introduced into a catalytic bed in the presence of hydrogen and under conditions which reduce the sulphur content of the catalytic hydrocarbon product to between one-third and one-half of its original content. These processes are relatively economical and find great utility in upgrading the quality of the residuum or heavy viscious hydrocarbons by a substantial reduction of their sulphur contents. The hydrodesulfurized hydrocarbons are highly attractive as fuels or even for use as low-sulfur feedstocks for subsequent refinery processing.

The catalysts employed in hydrodesulfurization are comprised of active-metals contained in a matrix of a porous ceramic-like material. For example, the catalyst may take the form of cylinders having one-eighth inch diameter and length. Many types of these catalysts have been employed to great utility for carrying out the hydrodesulfurization of high sulphur content hydrocarbon streams such as produced in refineries. In one process, a Middle East reduced crude having a sulphur content of approximately 4% by weight was processed by hydrodesulfurization into a residual heavy fuel oil which had a residual sulphur content of 0.5% by weight. The commercial acceptance of this process has been great due to its attractive economics for producing low-sulphur content fuels. However, many catalysts employed in the hydrodesulfurization process depend upon micropore structures for high desulfurization efficiency. The accumulation of any solid coating about the surfaces of the catalyst blocks the micropores and combines with the active-metals to reduce rapidly the efficiency of the catalyst. The accumulation of these solid coatings upon the catalyst can be especially severe within the inlet zone of the catalyst bed. These coating solids may accumulate at such a rate and amount at the inlet zone of the catalyst bed to produce complete obstruction to fluid flow through the bed. This condition leads to a rapid destruction of the operability of the catalyst within the hydrodesulfurization process.

The accumulating coating solids can be metal-containing compounds which are carried into the catalyst bed with the high-sulphur content hydrocarbon streams. These solids are principally iron compounds. The iron compounds may be formed in the subterranean environment from which crude oil is derived. Also, the iron compounds may be formed by corrosion, or other processes, within the metallic equipment used for refining the crude oil into the heavy hydrocarbon stream to be subject to hydrodesulfurization. Metal-containing compounds are present within the hydrocarbon streams as very finely divided, solid materials. These solids contain a high proportion of iron oxides and sulfides. Generally, substantially all of these solids can be removed by filtration through 0.45 micron membrane filter. Analysis of the filter-retained solids indicates proportionately few large particles are present. Generally, the 15 and 85 percentile particle sizes of these solids range between one and ten microns in diameter. Only a few of these solids had sizes between 10 and 100 microns in maximum dimension. The narrow range of particle size distribution in these solids has doomed to failure the use of mechanical filters for removing the solids to a sufficient level so as to avoid unacceptable plugging of the catalyst beds employed in hydrosulfurization. For example, a large-opening filter (10 microns) could be operated over extended periods of time but cannot successfully remove any significant portion of the solids from the hydrocarbon stream. A mechanical filter with a very small opening size (one micron) is quickly plugged by the accumulation of solids. Thus, the filter must be frequently washed to restore it to satisfactory operation. The cycling between operation and regeneration or cleaning is so unfavorable that the mechanical filter cannot be employed for this service with the major portion of the solids residing within a narrow particle size range.

The removal of solids from hydrocarbons by the use of electrofilters is well known. The electrofilter is a device having a filter bed of a porous material in which an electric field is maintained by one or more energized electrodes. The electric field is of high intensity so that the solids are removed from the hydrocarbon stream by their being tenaciously attached to the solid surfaces of the porous material. For example, the porous material could be a urethane foam sandwiched between electrodes energized to high DC potentials. An electrofilter with a fixed bed of urethane foam (or the like) must be discarded when the accumulated solids are sufficient to fill the porous spaces within the foam material or otherwise reduce its solids-removal efficiency to unacceptable levels. Alternatively, the foam material must be cleansed of the accumulated solids. The procedure shown in U.S. Pat. 3,394,067 may be employed for restoring the foam material in the electrofilter into acceptable operation by the removal of substantial quantities of the adhering solids. In this method, the solids-containing foam material is cleaned inplace by creating a hydraulic disturbance of sufficient intensity to loosen deposits which are then flushed from the porous mass by the fluid creating the disturbance. For this purpose, a liquid is flowed through the solids-containing porous filter mass within the electrofilter. A change of a process condition concerning the liquid flow causes the sudden introduction of a gas phase within the porous filter material. As a result, high turbulent flow conditions are produced to loosen the deposited solids from the pores of the filter material and the liquid flow removes these solids from the electrofilter. Preferably, gas is dissolved into a carrier liquid being passed into the electrofilter. A sudden reduction in pressure causes the gas to separate into a gas phase with high turbulent surging conditions being created in the filter mass. This cleaning function does not rearrange the matrix or pore pattern of the filter mass. Electrofilters of this arrangement and operation can be employed for removing solids from heavy hydrocarbons. However, the high solids contents of the hydrocarbon stream, and the viscous and heavy nature of such stream, detracts greatly from the effectiveness of this electrofilter system.

Another type of electrofilter may be employed in which the filter mass is composed of a porous bed formed of hard granular spheroidal particles. These particles must be cleaned periodically within the electrofilter to remove accumulating solids which degenerate the efficiency of the unit. However, the cleaning of solids from these particles by known techniques has failed to restore the electrofilter to even half the operational efficiency of which it was originally susceptible. Furthermore, the continued periodic cleaning of the electrofilter cannot avoid a decreasing efficiency from reacting a level which cannot be tolerated for economical operation. At such time, the electrofilter must be disassembled. The particles are removed to an external cleaning system where they can be scrupulously cleaned by hand to restore the electrofilter to its original efficient operation. Alternatively, the spheroidal particles forming the porous bed could be replaced by fresh materials in order that the electrofilter again has its original intended efficiency in removal of solids from hydrocarbons.

An electrofilter was found in many instances not to be restored to operation after a cleaning cycle. When this event occurred, the electrofilter had to be placed into a cleaning cycle for another period of time before being returned into operation for removing solid from hydrocarbons. This operational cleaning difficulty is believed to reside in the residual water content of the heavy oil stream. Although the oil stream does not contain an appreciable amount of dispersed and soluble water, only a very small amount of water is required to collect upon the particulate material of the porous bed of the electrofilter to cause a short circuit of the electric field needed to remove solids from the hydrocarbon stream. The hydrocarbon stream could be treated to make it substantially anhydrous for operation within the electrofilter. Complete water removal from hydrocarbon liquids is relatively expensive and process-wise is unacceptable for normal refinery processing. Thus, the problem of dispersed and dissolved water in the hydrocarbon stream containing solids can become a substantial obstacle to the use of electrofilters for removing solids from such streams.

Although the present discussion has centered about the removal of solids from hydrocarbon stream such as residual fuels which are employed in hydrodesulfurization processes, it is equally applicable to other types of solids to be removed from various viscous hydrocarbon streams such as diesel fuel, lubricating oils and like products derived from the process of crude oils. The technique obviously can be equally applicable to various crude oils.

SUMMARY OF THE PRESENT INVENTION

In accordance with one embodiment of the present invention, there is provided a process for the removal of solids from a viscous heavy hydrocarbon stream. The process includes the steps of adjusting the temperature of a porous bed of an electrofilter until the stream can flow therethrough without any significant condensation of water from the heavy hydrocarbon stream. The solids-containing stream is then passed through the porous bed formed of hard granular spheroidal particles. These particles are substantially uniform in size and of a rigid and substantially incompressible dielectric material. An electric field is established within the porous bed and has an intensity of at least 5 kilovolts per inch of DC potential so that the solids are removed from this stream by their tenacious adhesion to the particles. The stream with the reduced solids content is removed from the porous bed and sent to a subsequent utilization. The spheroidal particles are periodically cleaned of accumulated solids to restore the solids removal efficiency of the porous bed. Another aspect of the present invention provides a unique cleaning cycle for removing the adhering solids from the particles which substantially restores the electrofilter into highly efficient operation with a minimum of effort and materials.

DESCRIPTION OF THE DRAWING

The figure of the drawing is a perspective view, partially in vertical section, of an electrofilter system which is arranged for carrying out the steps of the process of this invention in removing solids from a heavy viscous hydrocarbon stream.

DESCRIPTION OF SPECIFIC EMBODIMENTS

Referring now to the drawing, there is shown an electrofilter system by which the present process may be carried out for removing solids from a viscous heavy hydrocarbon stream in a commercial environment such as in an oil refinery. The viscous heavy hydrocarbon stream may be any petroleum liquid but usually will be a crude oil or crude oil product such as atmospheric tower bottoms. This stream is of high viscosity and low API gravity so that the removal of solids by conventional mechanical filtration, clay towers and the like, becomes for practical purposes an operational impossibility. For example, the solids within the stream may be iron oxides having a particle size distribution in the range of 10 to 100 microns. In addition, the stream will contain small amounts of water which include water dispersed within the hydrocarbon phase and an amount of water which is soluble within the hydrocarbon phase at the elevated operating temperatures encountered within the system. Most commonly, the solids are metallic compounds such as iron oxides which are introduced into the hydrocarbon stream by storage and transfer through the various processing equipment within the refinery. In addition, non-metallic materials such as particles of carbon, filaments of vegetable or of organic origin, etc., may be found within the hydrocarbon stream. The hydrocarbon stream is supplied to the present electrofilter system through an inlet conduit 11 which is moved by a pump 12 through a heat exchanger 13 into the inlet 14 of an electrofilter 16. The motor control valve 15 regulates the flow of the stream entering the electrofilter 16.

The electrofilter 16 is composed of a metallic vessel 17 carrying top and bottom flanged closures 18 and 19, respectively, which closures may be secured in any fashion such as by bolting. The electrofilter 16 has an outlet conduit 21 in which flow is controlled by a motor control valve 22 for carrying the purified stream into a product outlet conduit 23. The electrofilter 16 contains a porous bed 24 which is comprised of a plurality of hard granular, spheroidal particles 26. These particles should be of a hard granular material which is substantially uniform in size. The term "spheroidal" is intended to include round, and oval and other non-rounded particles having minor to major axes in ratios not exceeding 4 to 6. By the term "uniform in size" is meant particles whose size distribution is not greater than two to one in average maximum dimension. In addition, these spheroidal particles should be rigid and of a substantially incompressible dielectric material. By "dielectric material," is meant a material having a relatively high electrical resistivity and a small dielectric constant approaching that of the hydrocarbon stream to be treated. The dielectric material, for best results, should have a dielectric constant generally below 8, and preferably, a constant in the range of about 5 to 7. Stated in another manner, the particles should be of a dielectric material having a relatively high electrical resistivity in comparison to water. The dielectric properties of the spheroidal particles provide a surface for efficient retention of the extracted solids in response to an electric field established within the electrofilter 16. Moreover, the surface of these particles provide for the ready release of the accumulated solids upon agitation of these particles (without the electric field) with a suitable wash liquid.

Any suitable solid dielectric material may be employed which has a sufficient compressive strength to resist being crushed in the bed 24. For example, blast furnace slag from steel mills having a range of particle sizes between one-eighth and one-half inches (in maximum dimension) may be employed. Similarly, a screened river gravel having dimensions between one-quarter and one-half inch sizes (in maximum dimension) may be employed. It is preferred to employ a spheroidal particle bed 24 which has approximately between 30 and 40 percent voids. It has been found that such beds operate very efficiently in removal of solids from hydrocarbon streams in the present process.

Preferably the spheroidal particles 26 are selected from glass beads having about a one-quarter diameter. In particular, the one-quarter inch diameter glass beads which are employed for propping subterranean formations during oil well stimulation techniques have been found to be very useful in the present process. These beads are specially prepared for use in propping subterranean formations during hydrofracing techniques because of exceptional physical characteristics. These special physical characteristics are provided by the rapid chilling of molten glass during the manufacture of these beads. This rapid chilling procedure forms a very tough, hard and smooth skin about the glass particles. These particles have a compressive strength greatly in excess of 50,000 p.s.i. and a tensile strength above approximately 8,000 p.s.i. They are a commercial article readily obtained from the Halliburton Company of Duncan, Okla. Since the "skin" about these beads is very smooth, the adhering solids (without the electric field) can be completely removed by proper use of a wash liquid. The skin is also very hard to resist scratching and the resultant reduction in the very high electrical resistance of each particle.

The bed 24 of spheroidal particles 26 occupies a substantial portion of the internal volume of the vessel 17. The bed 24 is usually of a capacity to provide a residence time of one to two minutes to the hydrocarbon stream being treated. Preferably, the bed has a cross-sectional area giving a flow volume to cross-sectional area of 7 to 10 gallons per minute per square foot of the bed 24. A void region 27 resides between the flanged closure 18 and the top surface of the bed 24. The void region 27 should have a volumetric capacity sufficient to permit a substantial vertical expansion of the particles 26. Generally, the particles should be permitted to expand at least 5% by volume to permit suitable cleaning action to be produced in accordance with the novel process hereinafter described. Usually, the bed 24 need not be expanded above approximately 40% by volume into the void region 27.

An electric field is provided within the bed 24 of the electrofilter 16. The electric field should have an intensity sufficient for removing solids from the hydrocarbon stream. More particularly, the electric field causes the solids to be removed from the hydrocarbon stream as it traverses the bed 24 before reaching the outlet conduit 21. The electric field causes these solids to adhere very tenaciously to the exterior surfaces of the particles 26. The electric field can be created by any suitable equipment of which there are many examples in the prior art. As illustrated in the drawing, the electric field can be provided by energized rod electrode 28 which is supported upon an entrance bushing 29 threaded into the flanged closure 18. Preferably, the electrode 28 is coaxially disposed within, but electrically isolated from, the vessel 17. The electrode 28 may extend substantially throughout the bed 24. Preferably, the electrode 28 extends only approximately between one-third and one-half of the depth of the bed 24. By this arrangement, the electric current loading upon electrical components associated with the electrode 28 is reduced but yet provides a high intensity electric field for acceptable solids removal from the hydrocarbon stream over an extended period of time.

The electrode 28 is energized from any suitable source of power such as a DC power pack 30. The power pack 30 is arranged to provide suitable energizing potential to the electrode through a high voltage cable 31. The cable 31 passes the high voltage current from the power pack 30 through the entrance bushing 29 to the electrode 28. Generally, the pack 30 provides energizing potentials between the electrode 28 and the vessel 17 of magnitudes sufficient to create between 5 and 50 kilovolts per inch gradient across the particles 26 in the bed 24. The pack 30 must provide energizing potentials of suitable elevated magnitudes to provide the desired potential gradients within the bed 24. These gradients create the force for removing the solids from the hydrocarbon stream traversing the electrofilter 16 and for the tenacious adhesion of the removed solids about the surfaces of the particles 26. The operation of the pack 30 can be controlled by a switch 32 whose operation is remotely controlled as illustrated by a chain line. The switch 32 interrupts the primary source of current from an input cable 33 to the pack 30.

The electrofilter 16 operates for extended periods of time removing substantially large amounts of the solids from the hydrocarbon stream. Eventually, the efficiency of the electrofilter 16 begins to decrease due to the accumulation of solids upon the particles 26. The efficiency of the bed 24 may be decreased by the accumulating solid so that one of two events occurs. First, the accumulated solids may reduce the effectiveness of the electrofilter 16 in removing solids from the liquid hydrocarbon stream to an extent that the remaining solids content makes unacceptable a desired subsequent utilization of the purified stream in the product conduit 23. Second, the accumulated solids may short circuit the electric field through the particles 26 between the electrode 28 and the vessel 17. The latter condition occurs rather suddenly whereas the former is a gradual reduction in operating efficiency.

At this time, the electrofilter 16 has reached a state requiring cleaning for the removal of the accumulated solids from the particles 26 if the present process is to continue an acceptable level of solids removal from the hydrocarbon stream.

The accumulated solids could be removed from the particles 26 of the bed 24 by any manner of cleaning. For example, flow can be terminated to the electrofilter 16 by the closure of valves 15 and 22. At this time, the hydrocarbon stream is passed through a bypass conduit 34 by opening motor control valves 36 and 37. The liquid hydrocarbon stream diverted to the bypass conduit 34 may be sent through the product conduit 23 to a second electrofilter for treatment. Depending upon the length of the cleaning operation or cycle, the hydrocarbon stream could be bypassed to the subsequent utilization directly without purification in a second electrofilter when the amount of solids contained in the bypassed stream is a relatively small amount compared to the overall flow of the treated stream.

The particles 26 could be removed from the electrofilter 16 by using a vacuum hose or the like for their transfer into an exterior cleaning vessel where they can be intimately washed with a wash liquid. However, it is preferred that these particles be cleaned inplace. In accordance with another aspect of this process the energization of the power pack 30 is interrupted through opening of the switch 32. A flow of wash liquid is directed upwardly through the particles 26 so as to expand the bed 24 into the void region 27. For this purpose, the wash liquid is taken from a tank 38 and moved by a pump 39 through a conduit 41 into a distributor 42 residing in the lower portion of the vessel 17. Preferably, the wash liquid is a hydrocarbon solvent such as kerosene, naphtha, diesel fuel and other distillates. For best results, the wash liquid is contained in a closed cycle system in the present process. The flow through the conduit 41 is regulated by a motor control valve 43. The distributor 42 may take any configuration but preferably is a vertical pipe which extends a short distance into the lower portion of the bed 24. The distributor 42 has a plurality of openings 44 in its side wall for introducing the wash liquid into the vessel 17. The wash liquid is introduced at a sufficient rate to cause the bed to expand into the void region 27 by at least 5% by volume. Preferably, the wash liquid causes a volumetric expansion of the bed 24 in the range of between 30 and 35%. Generally, the bed 24 does not need to be expanded more than 40% by volume into the void region 27 for acceptable results in the cleaning operation. For example, an upward flow of kerosene in the amount of approximately 7 cubic feet for each 100 pounds of spheroidal particles 26 within the electrofilter 16 is sufficient to expand the bed 24 by about 30% by volume. The flow of the wash liquid under these bed expanded conditions will not produce the desired cleaning of the tenaciously adhering solids from the particles 26. The wash removes only the weakly attached solids from these particles. In accordance with the present process, a small quantity of gas, such as nitrogen, natural gas, or other gas acceptable within environment of the bed 24 without creating injurious conditions, is introduced into the wash liquid entering the bed 24. For this purpose, a suitable source introduces a flow of gas into a gas inlet conduit 46 under the controlled operations provided by a motor control valve 47. The gas intermingles with the solvent entering the distributor 42 of the vessel 17. The amount of gas introduced into the wash liquid is not large. Generally, the gas will be introduced in that amount which produces an additional 4 to 5% volume expansion of the bed 24 into the void region 27. It has been found that usually one to two s.c.f.m. of gas for each 7 cubic feet per mintue of wash liquid flow are required for good cleaning of the solids from the particles 26. This flow with one-quarter inch glass beads corresponds to a superficial velocity of 280 inches per minute.

The addition of this small amount of gas into the wash liquid produces a phenomenal change in the cleaning environment of the particles 26. This small amount of gas produces a unique circulating bed condition within the electrofilter 16. By "circulating bed condition" is meant that all the particles 26 are slowly moved in a general circular or spheroidal movement within the vessel 17 between closures 18 and 19, and each individual particle has a circular or toroidal movement relative its neighbor at moderate velocities but with very intimate contact. The particles 26 constantly contact one another and the walls of the vessel 17. In addition, the gas phase within the wash liquid provides a second unique function which resembles the production of a froth in air flotation operations. Small bubbles of gas produce a thorough washing action which quickly removes the adhering solids from the surfaces of these particles. The removed solids are gathered with small gas bubbles into a froth in their passage upwardly through the bed 24 and the void region 27, and then outwardly in a wash liquid outlet 46 through a motor control valve 47 and into a solid separator 48. Although the particular operation of the gas introduction into the wash liquid for producing the outstanding cleaning of the solids from the particles 26 is not altogether understood, it is believed however that the injected gas produces multitudes of tiny gas bubbles upon the particles 26 which appear to create constantly changing particle-gas-liquid interfaces that provide the major scrubbing action to remove the adhering solids from these particles. A substantial amount of water can be combined with, absorbed or otherwise carried by these solids which makes the solids highly conductive to electrical currents. This scrubbing action also removes any water films and droplets adhering to the particles 26. As a result, this novel cleaning function is capable of removing concurrently both solids and water from the particles 26.

The solid separator 48 can be a settling vessel containing baffles or the like where the removed solids are segregated by gravitational force from the wash liquid. These settled solids are removed periodically through a waste solids outlet 49 by operation of a motor valve 51. The removed solids may be dried to form a waste solid which could be buried in a landfill. The wash liquid, freed from the solids in the separator 48, is transferred by a conduit 52 to the wash liquid storage tank 38. The gas phase quickly separates from the wash liquid in the separator 48 and escapes through the gas vent 53 to any suitable disposal or recovery system.

The solids usually separate relatively quickly from the wash liquid in the separator 48. If desired, a small quantity of water (less than 1% by volume) may be introduced into the solids separator tank 48 to water-wet the solids which assists in their separation from the wash liquid. A small amount of water dissolved in the wash liquid will not interfere with the normal operation of the present process. Other steps in the present process provide conditions in the electrofilter 16 to prevent such small amounts of water from creating short circuit conditions and other undesired problems.

Generally, only a few minutes of time are required for the expanded bed-type of cleaning action of the present process to restore the spheroidal particles 26 to the proper operating state in the vessel 17. Thus, the electrofilter 16 can be operated in the present process for an extended period of time, as for example 36–50 hours in duration. Then, the electrofilter 16 is placed into the cleaning cycle which may be, for example, less than 30 minutes in duration. At the end of the cleaning cycle, the pump 39 is shut down and the valves 43, 47 and 50 are closed.

It has been found that in the operation of the process, the hydrocarbon stream carries dissolved water into the electrofilter 16. The wash liquid may carry both dispersed and dissolved water into the bed 24. Sufficient amounts of water can condense upon the particles 26 to cause a short circuit condition to the electrical field in the bed 24 immediately or after only a short period of operation. For example, the hydrocarbon stream may be obtained from the processing of crude oil into a residuum such as atmospheric tower bottoms. Atmospheric tower bottoms are produced through the distillation (at substantially atmospheric pressure) of crude oil to effect the removal of gasoline, kerosene and intermediate naphthas and a gas oil having an end-point of about 750° F. Atmospheric tower bottoms are an excellent charge for a hydrodesulfurization operation. However, this stream carries relatively large amounts of solids which were originally present in the crude oil or which had been acquired from the metallic surfaces of the processing equipment employed in the refinery. The atomspheric tower bottoms stream is usually at temperatures of approximately 1000° F. The stream passing through the inlet conduit 11 must be cooled in the heat exchanger 13 to temperature suitable for passage through the electrofilter 16. For example, the stream will be cooled to approximately 350° F. by the heat exchanger 13. This stream cooling is necessary for two reasons. First, the hydrocarbon stream at 1000° is extremely conductive to electrical currents and would effectively short circuit the electric field within the bed 24 of the electrofilter 16. Second, the excessive temperature of this stream can rapidly deteriorate the insulating components associated with the energized electrode 28. For example, there is no insulating material of which the entrance bushing 29 could be constructed that would withstand temperatures greatly in excess of 350° F. in complete safety for an extended operating life. Although the cooling of the hydrocarbon stream entering the electrofilter 16 is necessary, the cooling produces a second problem. The cooled hydrocarbon stream in the inlet conduit 14 has substantial amounts of water in solution. The heat exchanger 13 should not cool the stream sufficiently to cause some of the water to come out of solution and be distributed within the hydrocarbon stream entering the electrofilter 16. Thus, the stream entering the electrofilter contains water in solution and may even be under a water saturated condition. Unless the bed 24 is at a temperature at or slightly above the temperature of the incoming hydrocarbon stream, sufficient water condenses upon the particles 26 to cause an immediate short circuit condition of the electric field within the electrofilter 16. Obviously, a short circuit condition within the bed 24 prevents satisfactory removal of solids from the hydrocarbon stream. To avoid this problem, the bed 24 is heated to a temperature at or preferably slightly above the temperature of the incoming hydrocarbon stream by any system suitable for this purpose. Preferably, the system also provides for removal of any water in the wash liquid which may remain within the bed 24 after each cleaning cycle.

In accordance with one embodiment of the present process, the temperature of the bed 24 is adjusted until the hydrocarbon stream can flow therethrough without any significant condensation of water upon the particles 26. A stream of dry solvent from a dry solvent tank 56 is moved by a pump 57 through a conduit 58, a heat exchanger 59 and a motor control valve 61 into the inlet 14 of the electrofilter 16. The dry solvent flows downwardly through the bed 24 to the outlet conduit 21 and passes through a return conduit 62, a motor control valve 63, a drier 64 and for collection in the tank 54. The heat exchanger 59 elevates the temperature of the dry solvent sufficiently to bring the bed 24 to a temperature such that water will not condense upon the particles 26 upon receiving a flow of the hydrocarbon stream. For example, the hydrocarbon stream may be at 350° F. Thus, the particles 26 of the bed 24 should be heated to at least this temperature and preferably to a slightly higher temperature to avoid condensation of water from the flow of the hydrocarbon stream. The heated dry solvent flows through the bed 24 in a downward direction and carries any water from the wash liquid through the conduits 21 and 62 into the drier 64. The drier 64 is arranged to remove the water from the solvent stream prior to its return to the dry solvent tank 54. The drier 64 may be provided with a drying material such as calcium chloride, activated carbon, or special dehydrating clay mixtures. During the passage of the dry solvent through the electrofilter 16, the motor control valves 15 and 22 are closed so that the dry solvent passes through a relatively closed cycle system. As a matter of fact, the dry solvent within the electrofilter 16 can be displaced therefrom by opening of the valve 15 contemporaneously with the closure of the valve 61. The flow of the hydrocarbon stream displaces the dry solvent from the electrofilter through the line 21. Upon the hydrocarbon stream filling the electrofilter 16, the switch 32 activates the pack 30 creating the electric field within the bed 24. At this time, the valve 63 is closed and the valve 22 is opened so that purified hydrocarbon stream may pass into the product conduit 23. The unique cleaning cycle employed in the present invention removes solids from the particles 26 of the electrofilter 16 to the same extent they could be hand cleaned on an individual basis to restore their original efficiency.

Now, the switch 32 is closed to apply power to the pack 30 for applying elevated potentials to the electrode 28. The valves 36 and 37 are closed in the bypass conduit 34. The electrofilter 16 again functions to remove solids from the incoming hydrocarbon stream.

The unique cleaning cycle of the present invention may be readily distinguished from cleaning with only a flow of a liquid which passes upwardly through the bed 24 at certain rates sufficient to expand it into the void region 27. These certain rates of liquid flow produce a movement of a substantial portion of the particles 26 of the bed upwardly into the void region 27 with a relatively high rate of movement. The particles are held as a coherent mass in the upper portions of the vessel 17 for a short period of time and then they fall suddenly to the lower portion of the vessel 17 after the mass becomes hydrodynamically unstable in the flow of liquid. This upward movement and sudden fall is termed "slugging" and can occur at a relatively high frequency. For example, slugging has been observed to occur at a one cycle per second of frequency during an operation of an electrofilter with only high velocity liquid flow used to clean the particle 26. Alternatively, a high velocity jet of liquid injected coaxially through the vessel 17 produces a continuous movement centrally upwardly of the particles 26 from the bed 24. The particles move upwardly into the void region 27 and then fall downwardly around the exterior annulus of the bed 24 in a relatively slower movement. This resembles the "jetting" action of a large central jet within a fountain.

The displacement of the particles 26 with a flow of liquid under slugging or jetting flow conditions does not provide adequate solids removal from the particles 26. Both of these flow conditions even after extended cleaning periods do not produce the excellence of cleaning that the steps of the present cleaning steps produce within the bed 24.

Although the various operative functions described relative to the electrofilter shown in the drawing may be accomplished by manual control, it is preferable to obtain such operation through the use of automated devices. More particularly, the various motor control valves, pumps and the like may be actuated by a controller providing actuating signals as indicated by the chain line associated with these control elements. More particularly, a controller 56 can be employed to receive either manually or time based operate and clean cycle commands. The controller applies the necessary control signals in preset chronology to the various pumps, heat exchangers, and motor control valves as indicated through the chain lines. In the operate command, the controller 56 actuates the pump 12, opens valves 15 and 22, closes valves 36 and 37, and actuates switch 32 of the pack 30. The remaining process equipment is held in a non-flowing condition. During the cleaning cycle, the valves 15 and 22 are closed, switch 32 is opened and the flow of the incoming hydrocarbon stream is diverted through the bypass conduit by opening of the valves 36 and 37. At this time, the wash liquid system is actuated by opening the valves 43, 47 and 50 and starting the pump 39 to provide a flow of wash liquid and gas upwardly through the electrofilter 16. After the cleaning cycle is completed, these valves and pump associated with the wash liquid system are closed and the solids allowed to separate within the separator 48. Thereafter, the controller 56 provides an operative command to the valve 51 to dump separated solids from the separator 48 to some convenient disposal arrangement. Prior to returning the electrofilter to operation, the dry solvent system is actuated through starting the pump 57, operating the heat exchanger 59 and opening the valve 61. The dry solvent flow downwardly in the vessel 17 and is removed through the outlet 21, the drier 64 and into the dry solvent tank 54. The dry solvent flow continues until the bed 24 is substantially free of moisture. As mentioned previously, the control of the valves 15, 61, 22 and 63 may be so arranged that the incoming hydrocarbon stream displaces the volumetric capacity of the electrofilter 16 into the dry solvent system until the hydrocarbon stream reaches the outlet 21. At this time the controller 56 is arranged to open the valve 22 and close the switch 32 and valve 63 so that the hydrocarbon stream then passes through the electric field in the bed 24 and into the product conduit 23.

Obviously, other arrangements for controlling the functioning of the various valves, pumps, heat exchangers, etc., of the present process may be employed. The controller 56 may be of any suitable design, but preferably is a pneumatic signal controller such as may be obtained in a marketplace under the name "Autocater Alarm System." This system provides (on a preset time interval or in response to an operate control command) a plurality of signals in preset sequence for operating the motor control valves, switches, pumps, etc., of the arrangement illustrated in the drawing for carrying out the functions of the present process. Of course, these valves, switches, etc., may be operated manually. However, an automatic control sequencing system is of great advantage in providing proper control sequencing and trouble-free operations with a minimum of operator time.

It will be apparent that other arrangements of equipment may be employed for carrying out the process of the present invention. For example, the solids separator 48 may be replaced by an electrofilter having a foam type pack to trap the solids carried in the wash liquid stream. In this arrangement, the foam is periodically removed from the electrofilter and either cleaned or discarded and replaced by fresh foam. Other arrangements for removing the waste solids from the wash liquid stream can be used, if desired.

The present process has been field tested to illustrate the great utility of its operation. The electrofilter 16 consisted of a vertical oriented six inch diameter vessel which was six foot high and equipped with a ten inch standard Teflon entrance bushing supporting a one inch diameter by 54 inch long electrode 28. The vessel contained a bed of steel mill slag which was screened to provide a range of particles sizes between one-eighth and one-half inches (in maximum dimension). The power pack 30 applied high voltage DC. to the rod electrode and had an open circuit voltage of 40 kilovolts. A stream of atmospheric tower bottoms at approximately 300° F. was passed through the electrofilter. The atmospheric tower bottoms had an API gravity of 17.0, a SUS viscosity of 140 at 210° F. and between 50 and 55 at 300° F. From the atmospheric tower bottoms, the solids retained upon a 0.45 micron membrane filter were 25 pounds per thousand barrels. The electrofilter was operated for several hours (in the operate cycle command) and provided an average solids removal of 55%. The electrofilter was then opened and the gravel particulate bed was replaced by 100 pounds of glass beads which had a quarter inch diameter. The glass beads were hydrofracing beads purchased from Halliburton Oil Company. The electrofilter was again operated in operate command cycle at a rate between 7.5 and 10 gallons per minute of the atmospheric tower bottom. Over 100 hours of operation were sustained with as high as 85% removal of solids. An average of 55% solids removal was sustained for over 76 hours of operation. The beads could be readily regenerated by a flow of wash liquid with a small amount of nitrogen added to the liquid for a short period of time (30 minutes estimated).

The electrofilter 16 could be operated on a shorter period (in the operate cycle command) so that approximately 90% removal of solids from the hydrocarbon stream would be obtained. The regeneration cycle is estimated to require not over 30 minutes of time. It is essential after the cleaning cycle and before returning the electrofilter to receiving a stream of hydrocarbon material that the bed 24 be adjusted in temperature so that no significant water from the heavy hydrocarbon stream is condensed upon the particles 26. Otherwise, an immediate short circuit condition occurs within the electrofilter 16.

From the foregoing, it would be apparent that there has been provided a process for the removal of solids from heavy hydrocarbon streams which not only can remove up to 90% of the solids from such streams but can be operated continuously with extended operate cycles and intervening short cleaning cycles. Thus, the process provides for highly efficient removal of solids from hydrocarbon streams which may then be processed in solids-sensitive systems such a hydrodesulfurization catalytic units. It will be understood that separate steps and alterations of steps in the present process may be employed without departing from the spirit of this invention. This is contemplated by and within the scope of the appended claims. Additionally, it is intended that the present description is to be taken as an illustration of the present process.

What is claimed is:

1. A process for the removal of solids from a heavy hydrocarbon stream contaminated with water comprising:
   (a) adjusting the temperature of a porous bed until the stream can flow therethrough without any significant condensation of water from said heavy hydrocarbon stream;
   (b) passing the solids-containing stream through said porous bed, said bed being formed of hard granular spheroidal particles, which particles are substantially uniform in size and of a rigid and substantially incompressible dielectric material;
   (c) establishing an electric field within said porous bed having an intensity of at least 5 kilovolts per inch of DC potential whereby solids are removed from said stream by their tenacious adhesion to said spheroidal particles;
   (d) removing the stream with a reduced solids content to a subsequent utilization; and
   (e) periodically cleaning said spheroidal particles of the accumulated solids to restore the solids-removal efficiency of said porous bed.

2. The process of claim 1 wherein said periodic cleaning of said spheroidal particles includes:
   (a) terminating the flow of said stream through said porous bed,
   (b) discontinuing said electric field within said porous bed,
   (c) passing a wash liquid upwardly through said porous bed at a flow rate sufficient to expand same in an amount of at least 5 percent by volume, and
   (d) introducing into said wash liquid of a small amount of gas sufficient to expand said porous bed by an additional 5 percent by volume,
whereby said spheroidal particles follow a circular course within said porous bed in its expanded state and the individual spheroidal particles are induced into continuous circular movements relative to one another with extreme intimate contacting for efficient loosening of the adhering solids which are removed in upward fluid flow from said porous bed in a froth-like condition.

3. The process of claim 2 wherein said wash liquid is a hydrocarbon distillate.

4. The process of claim 3 wherein said gas is nitrogen.

5. The process of claim 2 wherein said wash liquid is passed upwardly through said porous bed at a rising rate of about 280 inches per minute through said spheroidal particles, and said gas is introduced into said porous bed at a rate of about one s.c.f.m. for each 7 c.f.m. of liquid flow.

6. The process of claim 1 wherein said hydrocarbon stream is atmospheric tower bottoms produced by distillation of crude oil to remove an overhead product having an end point of about 750° F.

7. The process of claim 1 wherein said spheroidal particles are round glass beads.

8. The process of claim 7 wherein said glass beads have a diameter of about one-quarter inch.

9. The process of claim 2 wherein said solids removed from said spheroidal particles are separated from said wash liquid and gas, and the clarified wash liquid is recycled into subsequent periodic cleaning of said porous bed.

10. The process of claim 9 wherein a small amount of water in an amount less than about one percent by volume is added to the solids and wash liquid mixture removed from said porous bed before said solids are separated from said spheroidal particles.

11. The process of claim 2 wherein said solids removed from said porous bed and said wash liquid are separated from said gas, and said solids and wash liquid are passed through an electrofilter having a dielectric foam which retains said solids and produces a solids-free wash liquid stream.

12. The process of claim 1 wherein the step (a) is provided by a flow of heated dry solvent which is passed through said bed until said spheroidal particles are substantially free of moisture and reach an elevated temperature at which no significant amounts of water can condense thereupon from said heavy hydrocarbon stream.

13. The process of claim 12 wherein said dry solvent is hydrocarbon distillate.

14. The process of claim 12 wherein said dry solvent heats said porous bed until said spheroidal particles are at a temperature of about 50° F. above the temperature of said hydrocarbon stream as said hydrocarbon stream enters said porous bed.

15. The process of claim 12 wherein the flow of dry solvent displaces the first liquid volume of wash solvent from said porous bed through a drier and the following dry solvent is returned into a closed cycle circulation through a reservoir and heat exchanger for reintroduction into said porous bed.

16. The process 12 wherein the flow of said hydrocarbon stream displaces the first liquid volume of dry solvent from said porous bed before the first of said hydrocarbon stream is passed to a subsequent utilization after the removal of solids within the electric field in said porous bed.

17. The process of claim 16 wherein the electric field is established in said porous bed before said hydrocarbon stream passes throughout said porous bed as said hydrocarbon stream displaces said dry solvent from said bed.

References Cited
UNITED STATES PATENTS

| | | | |
|---|---|---|---|
| 2,573,967 | 11/1951 | Hamlin | 204—184 |
| 3,394,067 | 7/1968 | Shirley | 204—180 R |
| 3,190,827 | 6/1965 | Kok et al. | 204—302 |
| 2,534,907 | 12/1950 | Ham et al. | 204—188 |
| 2,136,660 | 11/1938 | Martin | 210—80 |
| 1,406,340 | 2/1922 | Brown | 210—80 |
| 2,996,442 | 8/1961 | Eberly, Jr. et al. | 204—184 |

JOHN H. MACK, Primary Examiner

T. TUFARIELLO, Assistant Examiner

U.S. Cl. X.R.

204—308

UNITED STATES PATENT OFFICE
CERTIFICATE OF CORRECTION

Patent No. 3,799,855　　　　　　　　Dated March 26, 1974

Inventor(s)　A. D. Franse

It is certified that error appears in the above-identified patent and that said Letters Patent are hereby corrected as shown below:

Column 3, line 38, for "reacting", read +++reaching+++;

Column 5, line 37, between "one-quarter" and "diameter", insert +++inch+++;

Column 7, line 12, between "process" and "the", insert a comma +++,+++;

Column 11, line 6, for "flow", read +++flows+++; and

Column 14, line 10, between "process" and "12", insert +++of claim+++.

Signed and sealed this 13th day of August 1974.

(SEAL)
Attest:

McCOY M. GIBSON, JR.　　　　　　　C. MARSHALL DANN
Attesting Officer　　　　　　　　　Commissioner of Patents